June 28, 1938.  J. T. MILES  2,122,349
SAFETY EGG LAYING NEST
Filed Oct. 29, 1936
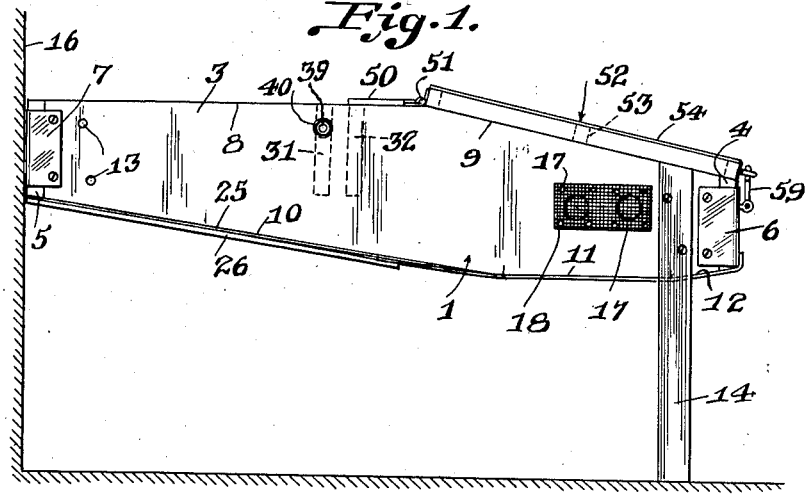
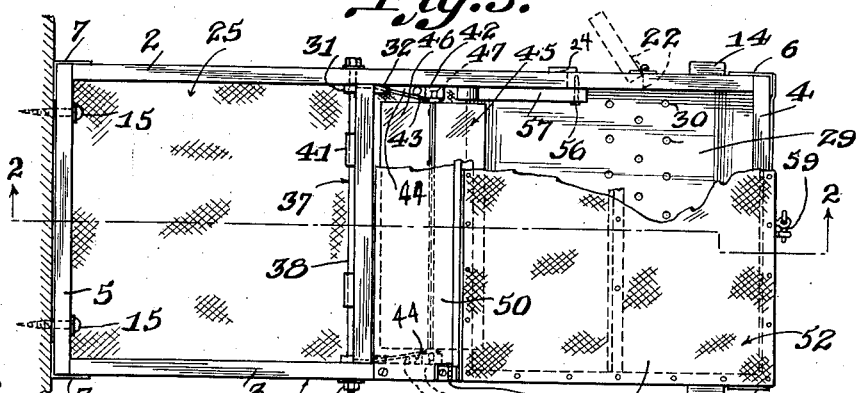
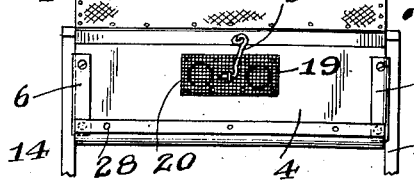
Inventor
James T. Miles
By Kimmel & Crowell
Attorneys Patented June 28, 1938

2,122,349

UNITED STATES PATENT OFFICE 2,122,349

SAFETY EGG-LAYING NEST

James T. Miles, Hamlin, Tex.

Application October 29, 1936, Serial No. 108,297

4 Claims. (Cl. 119—48)

This invention relates to a safety egg-laying nest.

The object of the invention is to provide, in a manner as hereinafter set forth, a nest arranged to prevent the breaking or cracking of an egg laid therein and to protect the laid egg from egg-eating hens, skunks, dogs, crows, snakes or any kind of vermin.

A further object of the invention is to provide, in a manner as hereinafter set forth, a nest of the class referred to so constructed and arranged whereby the owner will be assured of subsequently obtaining therefrom an egg which has been laid in the nest by a hen.

A further object of the invention is to provide, in a manner as hereinafter set forth, a nest of the class referred to including a nesting compartment for a hen to lay an egg, an egg receiving compartment normally partly closed to and receiving the laid egg from the nesting compartment and compartments or pockets arranged between said other compartments for receiving a fumigating material.

A further object of the invention is to provide, in a manner as hereinafter set forth, a safety egg-laying nest having as a part thereof a normally closed ventilated laid egg receiving compartment having a normally closed outlet means for the passage of foreign matter when cleaning the nest.

Further objects of the invention are to provide, in a manner as hereinafter set forth, a safety egg-laying nest which is simple in its construction and arrangement, strong, durable, compact, readily assembled, thoroughly efficient in the use intended thereby, conveniently handled when occasion requires and inexpensive to manufacture.

With the foregoing and other objects which may hereinafter appear, the invention consists of the novel construction combination and arrangement of parts as will be more specifically described and as are illustrated in the accompanying drawing wherein is shown an embodiment of the invention, but it is to be understood that changes, variations and modifications may be resorted to which fall within the scope of the invention as claimed.

In the drawing:—

Figure 1 is a side elevation of a safety egg-laying nest, in accordance with this invention, having its rear end anchored to a wall or other support, Figure 2 is a longitudinal sectional view of the nest on line 2—2 of Figure 3, Figure 3 is a top plan view of the nest, with parts broken away, and Figure 4 is a front elevation of the nest.

A safety egg-laying nest in accordance with this invention may be provided with a pair of front and a pair of rear supporting legs, or it may be anchored at its rear to an upstanding object and include a pair of front supporting legs. The nest is illustrated, by way of example, as having its rear anchored to a vertical wall and its front provided with vertical supporting legs. The nest as illustrated is provided with means, at the rear of its sides, for coupling rear supporting legs thereto, if it be desired. The nest as illustrated includes but one nesting compartment and a laid egg receiving compartment leading from the said other compartment. It is to be understood that the nest may be set up with a bank of nesting and egg receiving compartments disposed in sidewise relation.

The nest includes an open top and closed bottom housing having as a part thereof a horizontally disposed frame-like body part 1, preferably rectangular and formed of a pair of side members 2, 3, a front member 4 and a back member 5. The side members are of materially greater height than thickness and are disposed on their lower lengthwise edges. The height of the said members may be as desired. The members 2, 3 are of greater length than the members 4, 5. The member 4 is positioned against the outer end edges of the members 2, 3. Angle-shaped corner irons 6 are secured to the members 2, 3, 4 for connecting them together. The member 5 is positioned against the rear end edges of the members 2, 3. Angle-shaped corner irons 7 are secured to the members 2, 3, 5 for connecting them together.

Each side member has its upper lengthwise edge formed of a horizontal portion 8 and a downwardly inclined edge portion 9 which extends from the outer end of the edge portion 8. Each side member has its lower lengthwise edge formed with a downwardly inclined portion 10, a horizontal portion 11 and an upwardly inclined portion 12. The latter is of less length than the portion 11. The portion 10 is of materially greater length than the portion 11. The portion 10 extends from the rear end edge of the side members and merges into the rear end of the portion 11. The latter merges at its forward end into the rear end of the portion 12. The portion 10 is arranged below the top of portion 8 and is of greater length than the length of the portion 8. The portion 10 also extends to a point below the edge portion 9. The portions 11 and 12 are arranged below the edge portions 9.

The side members 2 in proximity to their rear ends are formed with openings 13 for the passage of anchoring means for the rear supporting legs, not shown, if such legs are desired to be used. Secured to the outer faces of the side members, in proximity to their outer ends, are front supporting legs 14. As shown body part 1 is secured at its back by the holdfast means 15 to a wall or other support 16. When rear supporting legs are employed, the holdfast means 15 are dispensed with.

Each side member between its vertical median and its forward end is provided with a pair of spaced, parallel ventilating openings 17 which are screened by a reticulated member 18 anchored to the outer face of the side member. The front member 4 is formed with a pair of spaced, parallel ventilating openings 19 which are screened by a reticulated member 20 anchored to the outer face of the front member 4. The side member 2 between its vertical median and forward end is provided with a cutout 21 opening at the edge portion 11 of such member. Positioned in the cutout is a door 22 hinged to the side member 2 as at 23. The cutout 21 forms a clean-out opening for foreign bodies within the nest structure and such clean-out opening is normally closed by the door 22. A latch 24 is provided for detachably securing the door 22 in closed position.

Secured to the edge portions 10 of the side members and to the bottom edge of the back member 5 is a web of canvas or other suitable fabric material as indicated at 25. Positioned against the lower face of the canvas 25 and of less length than that of the canvas is a sheet 26 of any suitable material, preferably made of fibrous material. The canvas 25 and sheet 26 are flush with the outer side faces of the said side members. The canvas 25 and sheet 26 are secured against the bottom edges of the side members 2 and back member 5 by any suitable holdfast means, preferably short nails 27 secured in the bottom edges of the side members. Secured by the holdfast devices 28 against the edge portions 11, 12 and a part of the edge portion 10, as well as to the bottom edge and front face of the front member 4, is a metallic sheet 29 which has its rear terminal portion positioned against the lower face of the forward terminal portion of the canvas 25. The rear end of the sheet 29 extends between the canvas 25 and the sheet 26. The sheet 29 is formed with a series of drainage and ventilating openings 30. The web 25, the sheet 26 of fibrous material and the metallic sheet 29 provide the bottom of the housing.

Secured to the inner face of each side member, intermediate the ends of the latter, is a pair of parallel, spaced guide members 31, 32 which are of a length less than the height of the side members and have their upper ends flush with the edge portions 8 of the side members. Mounted in the pairs of guide members is a vertically disposed partition 33 of a height less than the height of the side members. The bottom edge of the partition 33 is spaced from the canvas 25. The partition 33 in connection with the portions of the side members which extend rearwardly from said partition, the canvas 25 and the back member 5 provides an open top nesting compartment 34. The partition 33 in connection with the portions of the side members which extend forwardly therefrom, the front wall 4, a portion of the canvas 25 and the sheet 29 provides a laid egg-receiving compartment 35. The partition 33 in connection with the side members and a part of the canvas 25 provides a passage 36 which constitutes an outlet for compartment 31 and an inlet for the compartment 35. The canvas 25 constitutes a bottom for the compartment 34 which inclines downwardly from rear to front. A portion of the canvas 25 and the metallic sheet 29 provides a bottom for the compartment 35 and such bottom has a downwardly inclined rear portion, a horizontal intermediate portion and an upwardly inclined forward portion.

Extending through the side members and the guides 31 is a combined bracing and clamping element 37 consisting of a headed tie rod 38 formed with threads 39 and mounted on and threadedly engaging with the tie rod is a clamping nut 40. The element 37 provides means for bracing the side members and also for frictionally binding the partition 33 against the upper portions of the inner faces of the side members to prevent the lowering of the partition. The upper portion of the rear face of the partition 33 has secured thereto a pair of spaced parallel grippers 41 to facilitate the removal of the partition 33 when desired. The grippers 41 are arranged directly over the rod 38 and if for some reason the partition 33 should become loose, the grippers 41 will abut the rod 38 and arrest the lowering movement thereof.

Secured against the inner faces of the side members forwardly of the passage 36 is a pair of vertically disposed parallel short supports 42. Secured to the inner faces of the side members directly below the bottom edge of the partition 33, of less height than the height of the passage 36 and extending forwardly therefrom is a pair of oppositely disposed inwardly inclined plates 43 which bear against the supports 42 and provide in connection with the side members pockets 44 for the reception of a suitable fumigating or insecticidal material.

Arranged within the rear portion of the compartment 35 in proximity to the passage 36 is a rotatable barrier element 45 formed of a set of vanes 46 disposed at right angles to each other and connected to pintles 47 which are journaled in the supports 42. When the egg is laid it slides down the canvas 25, but too rapid movement of the egg as it slides from compartment 34 to compartment 35 is arrested by the element 45 and in this connection attention is directed to Figure 2. The laid egg is designated 48. The element 45 is so constructed that a vane 46 thereof will be disposed vertically and in opposed spaced relation to the passage 36 and also in the path of the egg 48. Arranged within the compartment 35 and secured to the lower part of the inner face of the front member 4 is a cushion 49 to prevent the egg empacting against the front member 4.

Secured upon the forward terminal portions of the edge portion 8 of the side members is a cross piece 50 arranged forwardly of the partition 33 and over the element 45. Hinged to the cross piece 50, as at 51, is the rear end of a cover member 52 for the top of the compartment 35. The cover member 52 consists of a frame 53 covered by a sheet of canvas or other suitable material 54. One side of the frame 53 is notched as at 55. Pivotally connected to the inner face of the side member 2, as at 56, is a pointed retaining arm 57 which engages in the notch 55 for holding the cover member 52 in an open position relative to the top of the compartment 35. When the arm 57 is in inactive position it is supported on a lug 58 on the inner face of the side member 2. The cover member 52 and front wall 4 are provided with coacting means 59 for latching the cover member in closed position.

The canvas 25 may be treated in a manner so as to prolong its life. The nest can be conveniently repaired when occasion requires. The manner in which the nest is constructed provides an unusually sanitary one. The canvas 25 is reinforced by the sheets 26, 29.

What I claim is:—

1. In a safety egg-laying nest, a substantially rectangular horizontally disposed open top and closed bottom housing provided with a transversely extending partition dividing it into a rear open top nesting compartment and a forward open top laid egg receiving compartment, a cross piece forwardly of said partition and extending across the top of the housing above the rear of the forward compartment, a closure element hinged to said cross piece for normally closing the open top of the forward compartment, said partition being of less height than that of and having its lower end spaced from the bottom of the housing, the sides and bottom of the housing having portions coacting with the lower end of the partition to provide a passage for establishing communication between said compartments for the passing of a laid egg from the rear to the forward compartment, parallel upstanding supports in the rear of the forward compartment and spaced from said partition, and a laid egg actuated rotatable barrier element journaled in said supports transversely of said forward compartment and including a plurality of radially disposed vanes for successively retarding the travel of the laid eggs on entering the forward compartment.

2. The invention as set forth in claim 1 having a pair of spaced guides for each end of the partition, each pair of guides being secured to the inner face of a side of the housing, and releasable clamp-means mounted in the sides of the housing for clamping the partition to said sides.

3. The invention as set forth in claim 1 having the housing bottom consisting of an inner section in the form of a web of canvas, an outer section in the form of a fibrous sheet and an intermediate section in the form of a sheet of metallic material, said intermediate section having its rear terminal portion positioned against the lower face of the forward terminal portion of said inner section, said inner and outer sections being secured to the rear and side walls of the housing, said intermediate section being secured to the side and front walls of the housing, said web forming the upper face of the bottom of the rear compartment and the upper face of a portion of the bottom of the front compartment, that portion of said intermediate section extended from said web forming the remaining portion of the bottom of the front compartment.

4. The invention as set forth in claim 1 having two pairs of spaced guides for the ends of the partition, said pairs of guides secured to the inner faces of the side walls of the housing in parallel relation, one of the guides of each pair being disposed in the forward end of the rear compartment and the other guide of each pair being arranged in the rear end of the forward compartment, releasable clamp-means supported by the sides of the housing for releasably clamping the partition to said sides, and a pair of oppositely disposed inwardly inclined plates extending from the guides in the forward compartment to the supports in the latter and coacting with the sides of the housing to provide pockets for receiving an insecticide.

JAMES T. MILES.